F. J. VONDRACEK.
FLOOR SCRAPER.
APPLICATION FILED SEPT. 11, 1911.
1,027,676.
Patented May 28, 1912.
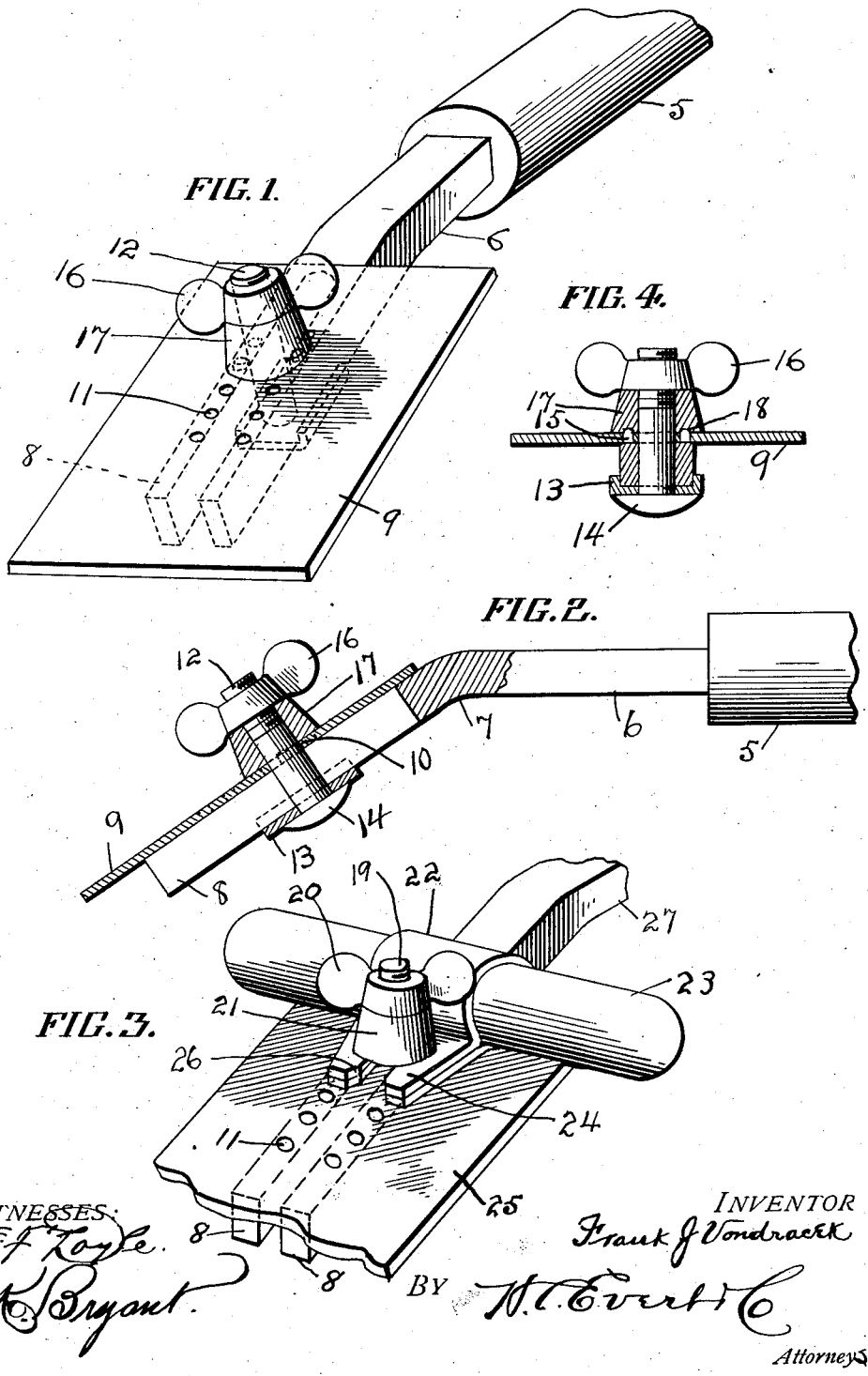
WITNESSES:
INVENTOR
Frank J Vondracek
BY
Attorneys

UNITED STATES PATENT OFFICE.

FRANK J. VONDRACEK, OF CEDAR RAPIDS, IOWA.

FLOOR-SCRAPER.

1,027,676.   Specification of Letters Patent.   Patented May 28, 1912.

Application filed September 11, 1911. Serial No. 648,677.

*To all whom it may concern:*

Be it known that I, FRANK J. VONDRACEK, citizen of the United States, and residing at Cedar Rapids, in the county of Linn and State of Iowa, have invented new and useful Improvements in Floor-Scrapers, of which the following is a specification.

This invention relates to improvements in floor scrapers.

An object of the invention is the provision of a simplified means for retaining a scraper blade in an adjusted position upon a suitable handle member and which elements may be easily and inexpensively manufactured.

A further object is the provision of a securing member for the handle and blade by which the relative positions of the members may be easily changed without the necessity of completely disassembling the device.

A still further object is to provide an adjustment in which the blade is slidable upon a handle tang and is capable of being securely positioned thereon at various points.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like numerals of reference designate corresponding parts throughout the several views: Figure 1 is a perspective view of the complete invention assembled. Fig. 2 is a partial longitudinal central view thereof. Fig. 3 is a perspective view of the modified form of the device, and, Fig. 4 is a detail sectional view of the adjusting elements of the form shown in Figs. 1 and 2.

Referring more in detail to the drawings, the handle 5 is provided with the tang 6 secured therein in the ordinary manner and having its outer free end longitudinally bent as at 7 and bifurcated adjacent this lateral point to form the two arms 8, 8. A blade member 9 is mounted upon the upper side of the tang and overlying the arms 8, 8, and is provided with a substantially central perforation 10 and with a row of smaller perforations 11 arranged parallel to each other and upon opposite sides of the central perforation and also parallel to the side edges of the blade. A bolt member 12 positioned through the blade perforation 10 is adapted to project between the arms 8 with a channel washer member 13 adapted to span said arms and having the head 14 of the bolt member seated thereon.

The upper faces of the arms 8 are provided at opposite points with upwardly-projecting lugs 15 adapted for reception within any two opposite perforations 11 of the scraper plate. For retaining the washer 13 within the perforations 11, there is provided a winged nut 16 while an intermediate frusto-conical washer 17 receives the bolt and seats upon the upper face of the scraper plate 9, while the said washer may also be provided with alining perforations 18 on its lower face if desired for receiving the said lugs.

In the modified form of the invention shown in Fig. 3, the scraper plate 25 is provided with a perforation for receiving the securing bolt 19 which is retained in position by the winged nut 20 and washer 21, the same being mounted upon bifurcated arms of the handle tang 27 in a manner identical to that set forth in the preferred construction herein. In this form of the invention, a removable hand bar 23 is provided which has a strap member 22 embracing and encircling the same with parallel projecting free ends 24 for receiving the bolt 19 therebetween, the said strap ends being impinged against the scraper blade 25 by the winged nut and washer upon the said bolt, it being understood that the head of the bolt engages a channel washer plate beneath the blade and spanning the lower faces of the tang bifurcations in an identical manner to that shown in the other views of the drawings and the said members 24 may be slotted in any desired manner but are here shown having V-shaped excisions 26 for the reception of the bolt. It will thus be noted that the cylindrical wooden member 23 which may be readily attached to and disengaged from the scraper is adapted to be employed as an additional handle in the operation of scraping to be grasped by both hands of the operator.

In the preferred embodiment of the invention, it will be noted that by slightly loosening the winged nut 16, the retaining lugs 15 may be easily disengaged from the receiving perforations and sockets and thus the plate 9 may be easily moved to a different position upon the tang arms 8 and without the necessity of completely removing the tang from disengagement with the blades.

While the forms of the invention herein shown and described are what are believed to be preferable embodiments thereof, it is nevertheless to be understood that minor changes may be made in form, proportion and size of the various parts without departing from the spirit and scope of the invention as set forth in the appended claims.

Having thus fully described my invention and in what manner the same is designed for use, what I claim as new and desire to secure by Letters Patent of the United States is:

1. A floor scraper comprising a tang member having a bent body-portion, terminal integral arms positioned thereon, a perpendicularly positioned cylindrical lug upon the upper face of each of said arms, a scraper plate provided with a large perforation and a row of smaller perforations upon opposite sides thereof arranged in parallelism with each other and the edges of said plate, a bolt adapted for reception within said larger perforation and between said arms, a head upon said bolt, a channel washer upon said bolt between said arms and head and embracing said arms and containing the lower faces thereof, a winged nut upon said bolt, and a washer between the same and said plate.

2. A floor scraper comprising a tang member, projecting lugs carried by said member, a scraper plate provided with a plurality of perforations therein and adapted to engage said lugs, a securing means engaging said tang and plate and adapted for retaining said lugs within said perforations, an auxiliary handle, a strap member embracing the same, bifurcated end members upon said strap member and adapted for engagement with the securing means.

In testimony whereof I affix my signature in presence of two witnesses.

FRANK J. VONDRACEK.

Witnesses:
JOHN N. ELY,
M. L. WOLRAB.

---

Copies of this patent may be obtained for five cents each, by addressing the "Commissioner of Patents, Washington, D. C."